(12) United States Patent
Zhang et al.

(10) Patent No.: US 12,534,660 B2
(45) Date of Patent: Jan. 27, 2026

(54) METHODS FOR CEMENTING WELLBORES UTILIZING SPACER FLUIDS THAT INCLUDE SURFACTANT PACKAGES

(71) Applicant: Saudi Arabian Oil Company, Dhahran (CN)

(72) Inventors: Xuan Zhang, Beijing (CN); Tianping Huang, Beijing (CN); Limin Xu, Beijing (CN); Vikrant B. Wagle, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/631,829

(22) Filed: Apr. 10, 2024

(65) Prior Publication Data
US 2025/0320399 A1   Oct. 16, 2025

(51) Int. Cl.
*C09K 8/42*   (2006.01)

(52) U.S. Cl.
CPC .................... *C09K 8/424* (2013.01)

(58) Field of Classification Search
CPC ........... C09K 8/40; C09K 8/424; C09K 8/501
See application file for complete search history.

(56) References Cited

U.S. PATENT DOCUMENTS

| | | | |
|---|---|---|---|
| 3,619,407 A | 11/1971 | Hendricks et al. | |
| 4,792,390 A | 12/1988 | Staggs et al. | |
| 4,814,064 A | 3/1989 | Staggs et al. | |
| 6,534,449 B1 * | 3/2003 | Gilmour | C09K 8/524 |
| | | | 507/263 |
| 6,686,323 B2 | 2/2004 | Nilsson et al. | |
| 7,318,477 B2 * | 1/2008 | Hou | C09K 8/40 |
| | | | 166/305.1 |
| 8,222,455 B2 | 7/2012 | Knox | |

(Continued)

FOREIGN PATENT DOCUMENTS

| | | |
|---|---|---|
| CN | 107603576 B | 11/2020 |
| EP | 3071666 B1 | 8/2020 |

(Continued)

OTHER PUBLICATIONS

Sodium Laureth 11 Carboxylate, retrieved Jul. 1, 2025 from https://www.ewg.org/skindeep/ingredients/723780-SODIUM_LAURETH11_CARBOXYLATE/ (Year: 2025).*

(Continued)

*Primary Examiner* — Angela M DiTrani Leff
(74) *Attorney, Agent, or Firm* — Dinsmore & Shohl LLP (57) ABSTRACT

A method for cementing a wellbore may include introducing a spacer fluid into the wellbore such that at least a portion of a drilling fluid positioned in the wellbore is displaced by the spacer fluid, the spacer fluid including from 80 wt. % to 99 wt. % of an aqueous based fluid, based on the total weight of the spacer fluid, from 1 wt. % to 20 wt. % of a surfactant package, based on the total weight of the spacer fluid, wherein the surfactant package comprises at least 99 wt. %, based on the total weight of the surfactant package, of the combination of one or more alkyl ether carboxylates, one or more alcohol ethoxylates, and one or more zwitterionic surfactants, and introducing a cement slurry into the wellbore such that at least a portion of the spacer fluid is displaced by the cement slurry.

19 Claims, 2 Drawing Sheets

(56) References Cited

U.S. PATENT DOCUMENTS

| | | | |
|---|---|---|---|
| 8,227,381 B2 | 7/2012 | Rodrigues et al. | |
| 8,235,120 B2 | 8/2012 | Quintero et al. | |
| 8,674,021 B2 | 3/2014 | Rodrigues et al. | |
| 9,145,523 B2 | 9/2015 | Choi et al. | |
| 9,341,052 B2 * | 5/2016 | Gadberry | C09K 8/74 |
| 9,512,348 B2 | 12/2016 | Reyes et al. | |
| 9,663,732 B2 | 5/2017 | Ganyu | |
| 9,701,893 B2 | 7/2017 | Bittner et al. | |
| 9,816,365 B2 | 11/2017 | Nguyen et al. | |
| 10,066,148 B2 | 9/2018 | Luyster et al. | |
| 10,066,172 B2 | 9/2018 | Choi et al. | |
| 10,294,764 B2 | 5/2019 | Champagne et al. | |
| 10,301,560 B2 | 5/2019 | Wang et al. | |
| 10,550,319 B2 | 2/2020 | McDaniel et al. | |
| 10,920,157 B2 | 2/2021 | Koseoglu | |
| 11,021,659 B2 | 6/2021 | Choi et al. | |
| 11,118,100 B2 | 9/2021 | Jung et al. | |
| 11,261,364 B2 | 3/2022 | Al-Yami et al. | |
| 11,384,294 B1 | 7/2022 | Fathi et al. | |
| 11,466,221 B2 | 10/2022 | Fathi et al. | |
| 11,591,511 B2 | 2/2023 | Purdy et al. | |
| 11,767,478 B1 | 9/2023 | Choi et al. | |
| 11,795,406 B2 | 10/2023 | Moore et al. | |
| 2003/0008803 A1 | 1/2003 | Nilsson et al. | |
| 2007/0042913 A1 * | 2/2007 | Hutchins | C09K 8/685 507/214 |
| 2013/0261032 A1 * | 10/2013 | Ladva | C09K 8/00 507/131 |
| 2014/0303047 A1 * | 10/2014 | Mcdaniel | C09K 8/52 507/209 |
| 2015/0072902 A1 | 3/2015 | Lafitte et al. | |
| 2016/0102239 A1 * | 4/2016 | Pietrangeli | E21B 43/16 166/312 |
| 2019/0177603 A1 * | 6/2019 | Abad | C09K 8/506 |
| 2020/0199443 A1 | 6/2020 | Zhou et al. | |
| 2020/0392271 A1 | 12/2020 | Lin et al. | |
| 2021/0102113 A1 * | 4/2021 | Hussain | C07C 235/10 |
| 2021/0198586 A1 | 7/2021 | Koseoglu | |
| 2021/0292633 A1 * | 9/2021 | Sherman | C09K 8/12 |
| 2023/0138419 A1 | 5/2023 | Hussain et al. | |

FOREIGN PATENT DOCUMENTS

| | | |
|---|---|---|
| WO | 2011130310 A1 | 10/2011 |
| WO | 2017218812 A1 | 12/2017 |

OTHER PUBLICATIONS

Araujo et al., "Application of Microemulsion System in the Formulation of Biodegradable Pre-Flush Fluid for Primary Cementing", Energies, vol. 13, No. 4683, pp. 1-14, 2020.

Curbelo et al., "Vegetable oil-based preflush fluid in well cementing", Journal of Petroleum Science and Engineering, vol. 170, pp. 392-399, 2018.

* cited by examiner

METHODS FOR CEMENTING WELLBORES UTILIZING SPACER FLUIDS THAT INCLUDE SURFACTANT PACKAGES

TECHNICAL FIELD

Embodiments of the present disclosure generally relate to natural resource extraction and, more specifically, to natural resource extraction wells.

BACKGROUND

There is a continual need for the discovery and extraction of subterranean fuel sources, such as oil and natural gas. Extracting subterranean fuel sources may require drilling a hole from the surface to the subterranean geological formation housing the subterranean fuel source. Specialized drilling techniques and materials are utilized to form the borehole and extract the subterranean fuel source. One such specialized material utilized in drilling operations is spacer fluid, which is generally positioned between drilling fluid and cement slurries during cementing processes in wellbores.

SUMMARY

Wellbores are commonly cemented, where the annulus between the tubular and the wellbore wall is filled with cement. Prior to cementing, the wellbore may be filled with a drilling fluid, sometimes referred to as drilling mud, that may be oil-based. To remove the drilling fluid, it may be displaced by the cement slurry, which enters the annulus, and is cured to cement. A spacer fluid may be utilized to separate the drilling fluid from the cement slurry, as the drilling fluid may be oil-based and the cement slurry may be water-based, such that their interaction would be detrimental to the cement slurry. When cement slurries are water-based, they may form stronger bonds with water-wettable surfaces. Therefore, wellbore sections drilled with non-aqueous drilling fluid (resulting in oil-wet surfaces) may exhibit relatively poor cement bonding if this issue is not addressed. Poor cement bonding may lead to poor isolation and, consequently, to a buildup of unwanted casing-casing or tubing-casing annular pressure.

Accordingly, there is a need for spacer fluids and methods of using the same that provide enhanced wettability for cement slurries on surfaces that were previously contacted by non-aqueous (for example, oil-based) fluids, such as some drilling fluids. More specifically, the use of surfactant in the spacer fluid formulation may aid in avoiding the cement bonding issues due to the altered wettability of surfaces due to oil-based drilling fluids. The presently disclosed spacer fluids typically include at least a base fluid, and a surfactant package. It has been presently discovered that a surfactant package that includes a combination of one or more alkyl ether carboxylates, one or more alcohol ethoxylates, and one or more zwitterionic surfactants may have enhanced performance, as described herein, as compared with spacer fluids that include other surfactants or do not include surfactants at all. For example, in some embodiments, the surfactant package in the presently disclosed spacer fluid formulations may improve mud removal and/or ensure the encountered surfaces are left water wet.

According to one or more embodiments, a wellbore may be cemented by a method comprising introducing a spacer fluid into the wellbore such that at least a portion of a drilling fluid positioned in the wellbore is displaced by the spacer fluid, the spacer fluid comprising from 80 wt. % to 99 wt. % of an aqueous based fluid, based on the total weight of the spacer fluid from 1 wt. % to 20 wt. % of a surfactant package, based on the total weight of the spacer fluid, wherein the surfactant package comprises all surfactants in the spacer fluid, and wherein the surfactant package comprises at least 99 wt. %, based on the total weight of the surfactant package, of the combination of one or more alkyl ether carboxylates, one or more alcohol ethoxylates, and one or more zwitterionic surfactants, and introducing a cement slurry into the wellbore such that at least a portion of the spacer fluid is displaced by the cement slurry.

Additional features and advantages of the described embodiments will be set forth in the detailed description which follows, and in part will be readily apparent to those skilled in the art from that description or recognized by practicing the described embodiments, including the detailed description which follows as well as the appended drawings and the claims.

BRIEF DESCRIPTION OF THE DRAWINGS

The following detailed description of specific embodiments of the present disclosure can be best understood when read in conjunction with the following drawings, where like structure is indicated with like reference numerals and wherein.

DETAILED DESCRIPTION

Embodiments of the present disclosure are directed to methods for cementing welbores using spacer fluids. As described herein, the spacer fluids may include a surfactant package the comprises a combination of one or more alkyl ether carboxylates, one or more alcohol ethoxylates, and one or more zwitterionic surfactants. According to some embodiments, the described spacer fluids that include this specific surfactant package may have, among other attributes, improved water wettability of surfaces contacted by an oil-based fluid, such as an oil-based drilling fluid.

In one or more embodiments, a method for cementing a wellbore may comprise introducing a spacer fluid into the wellbore such that at least a portion of a drilling fluid positioned in the wellbore is displaced by the spacer fluid. The method may further comprise introducing a cement slurry into the wellbore such that at least a portion of the spacer fluid is displaced by the cement slurry.

As used throughout the disclosure, a "spacer fluid" may refer to a fluid utilized to space any two other materials utilized in well production. For example, a spacer fluid may be utilized to separate a cement slurry from drilling fluid.

A wellbore, in general, is a hole that extends from the surface to a location below the surface. The wellbore can permit access as a pathway between the surface and a hydrocarbon-bearing formation. The wellbore, defined and bound along its operative length by a wellbore wall, extends from a proximate end at the surface, through the subsurface, and into the hydrocarbon-bearing formation, where it terminates at a distal wellbore face. The wellbore forms a pathway capable of permitting both fluid and apparatus to traverse between the surface and the hydrocarbon-bearing formation.

Besides defining the void volume of the wellbore, the wellbore wall also acts as the interface through which fluid can transition between the interior of the wellbore and the formations through which the wellbore traverses. The wellbore wall can be unlined (that is, bare rock or formation) to permit such interaction with the formation or lined (that is, with casing, tubing, production liner or cement) so as to not permit such interactions.

Figure 1:
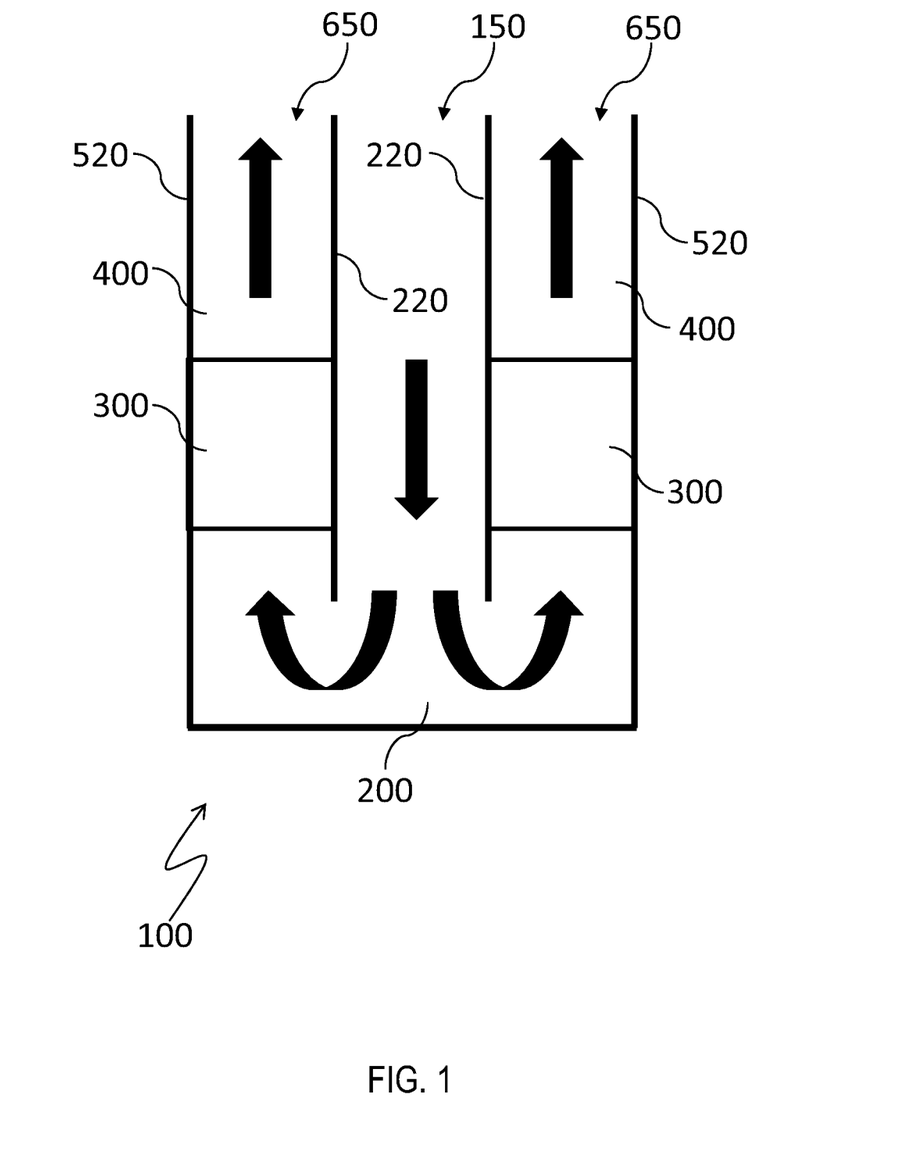
FIG. 1 schematically depicts a wellbore during cementing, according to one or more embodiments described herein.

Now referring to FIG. 1, a wellbore 100 during a cementing process is schematically depicted. As shown, the wellbore 100 comprises a wellbore wall 520 and a tubular 220, where the wellbore wall 520 and a tubular 220 are generally depicted in a cross-section view. The tubular 220 may be, without limitation, casing, liners, pipes, tubes, coiled tubing and other mechanical structures with interior voids. The wellbore wall 520 may define the perimeter of the wellbore 100, which may be generally cylindrical is various sections, formed by a drilling procedure. The tubular 220 may be generally cylindrical in shape and extend from the surface into at least a portion of the wellbore 100. The tubular 220 and wellbore wall 520 may be generally co-axial in some portions, as shown in FIG. 1. The perimeter of the tubular 220 may define a first conduit 150 and the second conduit 650 in the annulus (i.e., the generally co-axial area between the tubular 220 and the wellbore wall 520).

Still referring to FIG. 1, during a cementing process, the wellbore 100 may include cement slurry 200, spacer fluid 300, and drilling fluid 400. During cementing, spacer fluid 300 may be introduced into the first conduit 150, around the bottom of the tubular 220, and through the second conduit 650. Such introduction may be pumping the spacer fluid 300 from the surface into the first conduit 150. Following the introducing of the spacer fluid 300, cement slurry 200 may be introduced into the wellbore 100. As depicted, the spacer fluid 300 directly contacts the drilling fluid 400, and at least a portion of a drilling fluid 400 positioned in the wellbore 100 may be displaced by the spacer fluid 300. Additionally, as depicted, the cement slurry 200 directly contacts the spacer fluid 300, and at least a portion of a spacer fluid 300 positioned in the wellbore 100 may be displaced by the cement slurry 200. At least a portion of the drilling fluid 400 may exit the wellbore 100 through the second conduit 650. In some embodiments, the cement slurry 200 may be in contact with the spacer fluid 300. In one or more embodiments, the spacer fluid 300 may be in contact with a drilling fluid 400 and the cement slurry 500.

While drilling, drilling fluid (sometimes referred to in industry as "mud") fills the interior of the wellbore. Some muds may be petroleum-based materials and some may be water-based materials. Petroleum-based materials may comprise at least 90 weight percent of an oil-based mud ("OBM"). Examples of suitable base petroleum materials may include crude oils, distilled fractions of crude oil, including diesel oil, kerosene and mineral oil, and heavy petroleum refinery liquid residues. A minor part of the OBM may be water or an aqueous solution that resides internally in the continuous petroleum phase. Other OBM components may include emulsifiers, wetting agents and other additives that give desirable physical properties.

Oil-based muds may also include synthetic oil-based muds (SOBMs). Synthetic oil-based muds are crude oil derivatives that have been chemically treated, altered or and refined to enhance certain chemical or physical properties. In comparison to a crude temperature fraction of a partially-refined crude oil, which may contain several classes (for example, alkane, aromatic, sulfur-bearing, nitrogen-bearing) of thousands of individual compounds, a SOBM can comprise one class with only tens of individual compounds (for example, esters compounds in a $C_{8-14}$ range). Examples of materials used as base fluids for SOBMs include linear alpha olefins, isomerized olefins, poly alpha olefins, linear alkyl benzenes and vegetable and hydrocarbon-derived ester compounds. SOBMs are monolithic systems that behave in a manner as if they were an oil-based mud but provide a more narrow and predictable range of chemical and physical behaviors.

While performing drilling operations, drilling fluid circulates between the surface and the wellbore interior through fluid conduits. Drilling fluid also circulates around the interior of the wellbore. The introduction of drilling fluid into the wellbore through a first fluid conduit at pressure induces the motivation for the drilling fluid flow. Displacing drilling fluid through a second fluid conduit connected to the surface causes drilling fluid circulation from the first fluid conduit to the second fluid conduit in the interior of the wellbore. The expected amount of drilling fluid displaced and returned to the surface through the second fluid conduit is equivalent to the amount introduced into the wellbore through the first fluid conduit.

Cementing may be one of the most important operations in both drilling and completion of the wellbore. Primary cementing occurs at least once to secure a portion of the fluid conduit between the wellbore interior and the surface to the wellbore wall of the wellbore.

A variety of water-based cement slurries are available for primary cementing operations. Primary cements typically contain calcium, aluminum, silicon, oxygen, iron and sulfur compounds that react, set and harden upon the addition of water. The water used with the cement slurry can be fresh water or salt water and depend on the formation of the cement slurry and its tolerance to salts and free ions. Suitable water-based cements include Portland cements, pozzolana cements, gypsum cements, high alumina content cements, slag cements, silica cements, high alkalinity cements, latex and resin-based cements.

According to one or more embodiments, primary cementing forms a protective solid sheath around the exterior surface of the introduced fluid conduit by positioning cement slurry in the wellbore annulus. Upon positioning the fluid conduit in a desirable location in the wellbore, introducing cement slurry into the wellbore fills at least a portion if not all of the wellbore annulus. When the cement slurry cures, the cement physically and chemically bonds with both the exterior surface of the fluid conduit and the wellbore wall, coupling the two. In addition, the solid cement provides a physical barrier that prohibits gases and liquids from migrating from one side of the solid cement to the other via the wellbore annulus. This fluid isolation does not permit fluid migration uphole of the solid cement through the wellbore annulus.

Displacing wellbore fluid for primary cementing operations is similar to establishing circulation in the wellbore fluid with a drilling mud. An amount of cement slurry introduced into the wellbore through a first fluid conduit induces fluid flow in the wellbore and displaces an equivalent amount of wellbore fluid to the surface through a second fluid conduit. In such an instance, the wellbore fluid includes a portion of the wellbore fluid previously contained in the wellbore before cement introduction as well as the amount of the introduced cement slurry.

Direct contact between the water-based cement slurry and the oil-based drilling mud can result in detrimental fluid interactions that can jeopardize not only cementing operations but also the integrity of the wellbore. The intermingling of incompatible fluids can create emulsions (both water-in-oil and oil-in-water emulsions) between the fluids. The emulsions, which resist fluid movement upon the application of force, raises the viscosity profile of the wellbore fluid. Increasing pumping head pressure to maintain a constant fluid circulation rate in the wellbore can result in damaging the formation downhole as wellbore fluid pressure exceeds the fracture gradient of the formation.

Besides detrimentally affecting the viscosity profile, when solids and water from the cement slurry transfer into the oil-based drilling mud during emulsification, the oil-based mud properties are detrimentally affected. Dilution, chemical interaction, breaking of a water-in-oil emulsion and flocculation of suspended additives out of the oil phase can also occur.

Cement slurry properties can also suffer from contamination by the OBM. Flocculation of weighting agents and macromolecules can cause the cement to have reduced compressive strength. The diffusion of ionic species from the OBM can cause premature setting of the cement slurry. The ramifications of early cement hardening include equipment damage, time delay, wellbore damage and possible loss of the entire tubular string. Contamination of the cement slurry with bulk OBM results in higher slurry viscosity and higher fluid losses from the hardening slurry.

Without being bound by theory, it is believed that the spacer fluids presently disclosed (which include the specified surfactant package) may have a beneficial effect with respect to one or more of the problems with spacer cementing processes described. The spacer fluids are now described in detail hereinbelow.

As previously described in the present description, the spacer fluid may comprise an aqueous based fluid and a surfactant package. It should be understood that while embodiments of spacer fluids presently described include these components, other components may be included in a spacer fluid for various functional reasons, and it is contemplated that additional components may be included in the spacer fluids presently described.

The spacer fluid may include from 80 weight percent (wt. %) to 99 wt. % of the aqueous based fluid, based on the total weight of the spacer fluid and from 1 wt. % to 20 wt. % of a surfactant package, based on the total weight of the spacer fluid. For example, the spacer fluid may include from 80 wt. % to 99 wt. %, from 85 wt. % to 98 wt. %, from 90 wt. % to 97 wt. %, from 91 wt. % to 96 wt. %, or from 92 wt. % to 95 wt. % of the aqueous based fluid, based on the total weight of the spacer fluid. Also, for example, the spacer fluid may include from 1 wt. % to 20 wt. %, from 2 wt. % to 15 wt. %, from 3 wt. % to 10 wt. %, or from 4 wt. % to 7 wt. % of a surfactant package, based on the total weight of the spacer fluid.

As described previously, the spacer fluid may include the aqueous base fluid. The aqueous base fluid may be any fluid primarily comprised of water, and generally includes the vast majority of its composition as water (e.g, at least 80 wt. %, at least 90 wt. %, at last 95 wt. %, at least 99 wt. %, or even at least 99.9 wt. water). Examples of aqueous base fluid include, without limitation, deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. Fresh water may be utilized because of potential issues with introducing unnecessary amounts of ions, metals and minerals to cement slurry compositions that are more sensitive to such materials.

As described herein, the spacer fluid comprises a surfactant package. As used in this disclosure, a "surfactant package" refers to the group of one or more surfactant species which are included in the spacer fluid. The surfactant package includes all surfactants in the spacer fluid. The term "surfactant" refers to a compound capable of reducing the interfacial tension between two media, such as two liquids or a liquid and a solid. A surfactant in accordance with the present disclosure may refer to, without limitation, a cationic, anionic, zwitterionic, or nonionic compound capable of behaving as a surfactant.

The surfactant package may include at least 99 wt. % or consist of the combination of: one or more alkyl ether carboxylates, one or more alcohol ethoxylates, and one or more zwitterionic surfactants, based on the total weight of the surfactant package.

As used throughout the present disclosure, a "alkyl ether carboxylate" refers to a compound having the structure R-(O—R)$_n$COO$^-$, or a salt thereof, wherein R represents an alkyl group and n is an integer greater than or equal to 1. In embodiments, each R may be the same alkyl group or may be a different alkyl group. In one or more embodiments, the alkyl ether carboxylates may have the formula R$_1$-(OCH$_2$CH$_2$)$_n$COO$^-$, wherein R$_1$ may be an alkyl group with 7 to 28 carbons, and wherein n is from 2 to 25. In one or more embodiments, R$_1$ may be an alkyl group with 7 to 28 carbons, 8 to 25 carbon, 9 to 22 carbon, 10 to 20 carbon, 11 to 16 carbon, or 12 to 14 carbons, and n may be 2, 3, 4, 5, 6, 7, 8, 9, 10, 11, 12, 13, 14, 15, 16, 17, 18, 19, 20, 21, 22, 23, 24, or 25. As used herein, "alkyl group" or "alkyl functional group" refers to a functional group of the formula —(CH$_2$)$_n$CH$_3$ or —(CH$_2$)$_n$— wherein n is an integer greater than or equal to 1. Unless otherwise stated, the alkyl groups may be a substituted or unsubstituted alkyl groups. The "substituted" means that at least one hydrogen atom (—H) bonded to a carbon atom or heteroatom of a corresponding unsubstituted compound or functional group is replaced by a substituent. Unless otherwise stated, the alkyl groups may be branched or unbranched alkyl groups.

As used throughout the present disclosure, an "alcohol ethoxylate" or "ethoxylated alcohol" refers to a compound having the structure R-(O—R)$_n$-OH wherein R represents an alkyl group and n is an integer greater than or equal to 1. As should be appreciated, in the case of an ethoxylated alcohol, the degree of ethoxylation may vary from molecule to molecule by a standardized distribution, where some molecules include fewer than the desired number of ethoxy groups and some molecules include more than the desired number of ethoxy groups. In embodiments, each R may be the same alkyl group or may be a different alkyl group. One or more of the alcohol ethoxylates may have the formula R$_2$-(OCH$_2$CH$_2$)$_n$-OH, wherein R$_2$ an alkyl group with 7 to 28 carbons, and n is from 2 to 25. In some embodiments, R$_2$ may be an alkyl group with 7 to 28 carbons, 8 to 25 carbon, 9 to 22 carbon, 10 to 20 carbon, 11 to 16 carbon, or 12 to 14 carbons, and n may be 2, 3, 4, 5, 6, 7, 8, 9, 10, 11, 12, 13, 14, 15, 16, 17, 18, 19, 20, 21, 22, 23, 24, or 25.

In one or more embodiments, the alcohol ethoxylate may be an alcohol ethoxylate as described in US Patent No. U.S. Pat. No. 10,590,325, the entirety of which is hereby incorporated by reference.

As used throughout the present disclosure, a "zwitterionic surfactant" refers to a surfactant that is electrically neutral in its entirety but has a positively charged portion and a negatively charged portion. In various embodiments, the one or more zwitterionic surfactants may be betaine surfactants. As used herein, "betaine surfactant" refers to a surfactant having the structure R'-N$^+$(R)$_2$-(R)$_n$-COO$^-$, wherein R represents an alkyl group, R' represents an alkyl group, alkyl amide group, or alky ester group, n is an integer greater than or equal to 1.

In various embodiments, the betaine surfactants may have the formula $R_3-N^+(R_4)_2-(R_5)_n-COO^-$, wherein $R_3$ is an alkyl group, an alkyl amide group or an alkyl ester group with 4 to 28 carbons; $R_4$ is an alkyl group with 1 to 5 carbons; $R_5$ is alkyl group with 1 to 5 carbons, and n is an integer greater than or equal to 0. In some embodiments, $R_3$ is an alkyl group, an alkyl amide group or an alkyl ester group with 4 to 28 carbons, 6 to 26 carbon, 8 to 24 carbon, 10 to 22 carbon, 14 to 20 carbon, or 16 to 18 carbons; $R_4$ is an alkyl group with 1, 2, 3, 4, or 5 carbons; $R_5$ is alkyl group with 1, 2, 3, 4, or 5 carbons, and n is 0, 1, 2, 3, 4, 5, 6, 7, 8, 9, 10, 11, 12, 13, 14, 15, 16, 17, 18, 19, 20, 21, 22, 23, 24, or 25. As used herein, "alkyl amide group" or "alkyl amide functional group" refers to a functional group of the formula -R-(NH)-(C=O)-R, wherein n is an integer greater than or equal to 1 and R represents an alkyl group. As used herein, "alkyl ester group" or "alkyl ester functional group" refers to a functional group of the formula -R-(O)-(C=O)-R, wherein n is an integer greater than or equal to 1 and R represents an alkyl group.

In some embodiments, the one or more zwitterionic surfactants may be sulfobetaine surfactants. As used herein, "sulfobetaine surfactant" refers to a surfactant having the structure $R'-N(R)_2-(R)_n-SO_3^-$ wherein R represents an alkyl group, R' represents an alkyl group, alkyl amide group, or alky ester group, n is an integer greater than or equal to 1. In one or more embodiments, the sulfobetaine surfactants have the formula $R_6-N-R_7-Z$, wherein $R_6$ is an alkyl group, alkyl amide group or alkyl ester group with 4 to 28 carbons; $R_7$ is an alkyl group with 1 to 5 carbons; and Z is a propyl sulfonate functional group or a hydroxypropyl sulfonate functional group. As used herein, "propyl sulfonate" refers to a functional group having the structure $—(CH_2)_3SO_3^-$. As used herein "hydroxyropyl sulfonate" has the structure of propyl sulfonate except that one hydrogen group (—H) of the $—(CH_2)_3SO3$ is substituted with-OH. In some embodiments, $R_6$ may be an alkyl group with 4 to 28 carbons, 6 to 26 carbon, 8 to 24 carbon, 10 to 22 carbon, 14 to 20 carbon, or 16 to 18 carbons, and $R_7$ may be an alkyl group with 1, 2, 3, 4, or 5 carbons, and Z may be a hydroxypropyl sulfonate functional group. Without being bound by theory, sulfobetaines are believed to have superior salt tolerance than other types of betaines, and thus it is believed that using sulfobetaines as a zwitterionic surfactant may cause a spacer fluid comprising the surfactant package to more efficiently remove oil-based mud.

In some embodiments, the surfactant package may include from 10 wt. % to 40 wt. %, such as from 15 wt. % to 35 wt. %, from 20 wt. % to 30 wt. % or from 22 wt. % to 28 wt. % of the one or more alkyl ether carboxylates, based on the total weight of the surfactant package; from 10wt. % to 40 wt. %, such as from 15 wt. % to 35 wt. %, from 20 wt. % to 30 wt. % or from 22 wt. % to 28 wt. % of the one or more alcohol ethoxylates, based on the total weight of the surfactant package; and from 20 wt. % to 80 wt. %, such as from 30 wt. % to 75 wt. %, from 40 wt. % to 65 wt. %, or from 45 wt. % to 55 wt. % of the one or more zwitterionic surfactants, based on the total weight of the surfactant package. It is believed that these ratios of surfactant components may cause improve the oil-based mud removal efficiency of a spacer fluid that comprises the surfactant package.

In one or more embodiments, the spacer fluid may include from 0.5 wt. % to 2 wt. %, such as from 0.7 wt. % to 1.7 wt. %, or from 1 wt. % to 1.5 wt. % of the one or more alkyl ether carboxylates, based on the total weight of the spacer fluid; from 0.5 wt. % to 2 wt. %, such as from 0.7 wt. % to 1.7 wt. %, or from 1 wt. % to 1.5 wt. % of the one or more alcohol ethoxylates, based on the total weight of the spacer fluid; and from 1.0 wt. % to 4 wt. %, such as from 1.5 wt. % to 3.5 wt. %, or from 1.7 wt. % to 3 wt. % of the one or more zwitterionic surfactants, based on the total weight of the spacer fluid. Without being bound by theory, it is believed that the incorporation of these amounts of alkyl ether carboxylates, alcohol ethoxylates, and zwitterionic surfactants into the surfactant package may improve the oil-based mud removal efficiency of a spacer fluid that comprises the surfactant package.

In various embodiments, the spacer fluid may further include an organic solvent. The organic solvent may be a solvent comprising a majority of organic compounds, e.g. at least 80 wt. % organic compounds, at least 90 wt. % organic compounds, at least 95 wt. % organic compounds, at least 99 wt. % organic compounds, or at least 99.9 wt. % organic compounds.

According to one or more embodiments, the spacer fluid may include, based on the total weight of the spacer fluid, from 0.1 wt. % to 10 wt. %, of an organic solvent, such as from 0.1 wt. % to 10 wt. %, from 0.2 wt. % to 5 wt. %, from 0.5 wt. % to 3 wt. %, or from 1 wt. % to 2 wt. % organic solvent. The organic solvent may be chosen from limonene, 1-butanol, diethylene glycol monobutyl ether (DGMBE), or combinations thereof. The organic solvent may include limonene in an amount of from 0.5 wt. % to 3 wt. %, or 1.5 wt. % to 2.5 wt. % based on the total weight of the spacer fluid; and DGMBE in an amount of from 0.1 wt. % to 3 wt. %, or 0.1 wt. % to 1 wt. % based on the total weight of the spacer fluid. Without being bound by theory, it is believed that the incorporation of an organic solvent into the surfactant package may improve the mud removal efficiency of a spacer fluid that comprises the surfactant package.

In some embodiments, the surfactants may be amphiphilic, meaning that they may have a hydrophobic tail and a hydrophilic head that may lower the surface tension between two liquids or between a liquid. Without being bound by theory, it is believed that the use of amphiphilic surfactants may help may improve the mud removal efficiency of a spacer fluid that comprises the surfactant package.

In various embodiments, the spacer fluid composition may additionally include one or more viscosifiers. The viscosifier induces rheological properties (that is, thickening) in the spacer fluid composition that supports particle suspension and helps to prevent losses into the other fluids or the formation. The viscosifier can include biological polymers, clays, ethoxylated alcohols and polyether glycols. Biological polymers and their derivatives include polysaccharides, including xanthan gums, welan gums, guar gums, cellulose gums, corn, potato, wheat, maize, rice, cassava, and other food starches, succinoglycan, carrageenan, and scleroglucan and other intracellular, structural and extracellular polysaccharides. Biological polymers also include chemically modified derivatives such as carboxymethyl cellulose, polyanionic cellulose and hydroxyethyl cellulose (HEC) and forms of the polymers suspended in solvents. Clays and their derivatives include bentonite, sepiolite, attapulgite, and montmorillionite. Polyalklyene glycols include polyethylene glycols and polypropylene glycols, which are macromolecules with a series of internal ether linkages. Polyalklyene glycols are capable of dissolving in water and have a greater impact on viscosity with higher molecular weight. In one or more embodiments, the viscosifier may comprise TUNED SPACER E+, commercially available from The Halliburton Company.

The viscosifier can also include a viscosity thinner. A viscosity thinner reduces flow resistance and gel development by reducing viscosity of the spacer fluid. Thinners can reduce the flow resistance and gel development of filter cake and disrupt gelled materials that the spacer fluid composition contacts in the wellbore. Thinners comprising large molecular structures can also act as fluid loss additives. The functional groups of the viscosity thinners can act to emulsify oils and hydrocarbons present in the aqueous phase. Chemically modified viscosity thinners can attract solids and particles in the spacer fluid and disperse such particles, the dispersion of particles preventing any increase in viscosity of the spacer fluid due to aggregation. Ionic thinners can counter-act the effects of cement slurry intrusion into the aqueous spacer. Cement intrusion in the spacer fluid composition can result in greater saline concentration or higher pH, which in turn can cause the gel strength or the yield point value, or both, of the spacer fluid to rise. Low gel strength and yield point values may be good to maintain lower spacer fluid pumping pressure.

Polyphenoics, which include tannins, lignins, and humic acids, and chemically modified polyphenolics are useful viscosity thinners. Tannins and their chemically modified derivatives can either originate from plants or be synthetic. Examples of plant-originating tannins include tannins from pine, redwood, oak, and quebracho trees and bark; grapes and blueberries; and walnuts and chestnuts.

Chemically modified tannins include sulfomethylated and other sulfoalkylated tannins, causticized tannins, sulfated tannins, sodium-complexed tannin and sulfomethylated quebracho. Chemically modified lignins include sodium lignosulfonates, sugar-containing lignosulfonates, and de-sugared lignosulfonates. Humic acids, such as those extracted from decaying tree bark, are also useful rheology modifiers. Useful polyphenoics dissolve in the base aqueous fluid. In some instances, the chemically modified tannin pairs with similar ionic specie to assist in dissolving the tannin in the aqueous solution. For example, sulfomethylated tannins paired with ferrous sulfates are soluble in aqueous solutions.

The spacer fluid may also include one or more weighting agents. The weighting agent provides the spacer fluid with the proper density profile to separate the fluids from one another. The proper weighing of the spacer fluid composition relative to each fluid ensures that the spacer fluid composition does not "invert" with one of the other fluids present in the wellbore. Weighting agents include sand, barite (barium sulfate), hematite, fly ash, silica sand, ilmenite, manganese oxide, manganese tetraoxide, zink oxide, zirconium oxide, iron oxide and fly ash. One desirable weighting agent for the spacer fluid composition may be barite. Embodiments of the spacer fluid composition include compositions not including calcium carbonate as the weighting agent.

The density profile of the spacer fluid composition relative to the other fluids may be such that the spacer fluid composition has a similar or greater density than the displaced fluid but has a lower density than the displacing fluid. In some instances, the displaced fluid may be the oil-based mud and the displacing fluid may be the water-based cement slurry. The higher density spacer fluid composition pushes gelled and solid remnants of the displaced fluid away from the wellbore wall and fluid conduit exteriors.

The spacer fluid composition may have a density in the range of from 70 ppcf to 120 ppcf, such as from 80 ppcf to 90 ppcf. However, one of ordinary skill in the art should recognize that spacer fluids can have a density at any value within this range given the application circumstances and therefore understands that all values within the provided range are included.

The spacer fluid composition forms by combining one or more of the aqueous based fluid and the surfactant package. An example method of combining the spacer fluid components includes introducing into a vessel capable of retaining the spacer fluid composition a sufficient quantity of base aqueous fluid. Introducing each component into the base aqueous fluid separately and mixing the blend such that all the spacer fluid components are fully incorporated forms the spacer fluid composition. Blending means can include mixing using a low-or high-shear blender. Additionally, it should be understood that any compositional ranges supplied in this disclosure should be interpreted to mean that a combination of materials which fits into a particular class, such as a weighting agent, is in the composition range disclose, or that any single component of a particular class has the disclosed compositional range.

EXAMPLES

The following examples illustrate one or more features of the present disclosure. It should be understood that these examples are not intended to limit the scope of the disclosure or the appended claims in any manner.

Oil-Based Drilling Mud

Two oil-based drilling muds, OBM 1 and OBM 2, were obtained after drilling wells with temperature ranged from 120° C. to 160° C. The oil-based drilling muds were made up of white oil, barite, organic clay and stabilizing organic materials. The densities of OBM 1 and OBM 2 were 2.21 g/cm$^3$ and 1.60 g/cm$^3$, respectively.

Preparation of Spacer Fluids

Spacer fluids for all examples were prepared by adding 300 mL of tap water to a flask and stirring by magnetic stir at 500 rpm. For each example, the calculated chemicals in the surfactant package were dissolved in the tap water and heated to the test temperature for evaluation.

Sleeve Cleaning Test

A sleeve cleaning test was performed to evaluate the efficacy of the surfactants in the surfactant package to remove mud and allow water-wetting under low-shear conditions. A stainless-steel sleeve was used, and the measurement was conducted by the following procedures.

First, the stainless-steel sleeve was weighted. After weighing, the sleeve was immersed in oil-based drilling mud for 10 minutes. After the 10 minutes, the sleeve was removed from the oil-based drilling mud and allowed to drip for 2 minutes. After the 2 minutes the sleeve was removed and re-weighted to determine the amount of mud on the sleeve. Then, the sleeve was placed in a viscometer cup filled with spacer fluid that had been preheated to 60° C. The sleeve was rotated for a specific time (for example 5 minutes) at 100 rpm in the spacer fluid. After the specific time, the sleeve was removed from the spacer fluid and allowed to drip for 2 minutes. After the 2 minutes, the sleeve was re-weighted, and the mud removal efficiency was calculated according to Equation 1, wherein mo is the initial weight of the sleeve, mi is the weight of the sleeve coated with mud, and mt is the weight of sleeve after the sleeve cleaning test at a particular time.

$$\text{Mud Removal Efficiency} = \frac{m_t - m_0}{m_i - m_0} \quad \text{(Equation 1)}$$

Wettability Alteration Test

A wettability alteration test was performed to evaluate the wettability alteration performance of the surfactants in the surfactant package. The wettability alteration test was performed using a Fann C1001 wettability tester, which could measure both the electrical properties and surface-acting as specified in API Recommended Practices 10B2 (2013), the entirety of which is hereby incorporated by reference. The measurement was conducted by the following procedures.

The spacer fluid was first poured into a dry wettability blender until the electrodes were fully immersed. The meter was read. The temperature was maintained 80° C. The meter reading represented when the system was fully water external, and the surface was water-wet. The spacer fluid was then removed, and the wettability blender was thoroughly cleaned with water and dried to make sure the value of the meter was at 0 Hogans (Hn). Next, 200 mL of drilling mud was poured into the wettability blender. A low shear was used to create a vortex and the system was heated to 80° C. The value of the meter was 0 Hn. The preheated drilling mud was then titrated with the prepared spacer fluid under stirring until the meter reading was greater than the initial meter reading, which indicated that the emulsion was inverted from oil to water. The wettability was then calculated according to Equation 2, wherein Vs represents the volume of added spacer fluid, and Vo represents the volume of oil-based drilling mud.

$$\text{Wettability} = \frac{V_s}{V_s + V_o} \quad \text{(Equation 2)}$$

Example 1

A surfactant package composed of 25 wt. % alkyl ether carboxylate, 25 wt. % alcohol ethoxylate, and 50 wt. % zwitterionic surfactant was prepared. The alky ether carboxylate was composed of nine ethylene oxide functional group and alkyl group with 12~14 carbon atoms ($C_{12~14}H_{25}$-29-$(OCH_2CH_2)_9$-COONa) as AEC-9. The alcohol ethoxylate was isotridecanol ethoxylate composed of 4 moles ethylene oxide condensate of synthetic branched iso-tridecyl alcohol ($IsoC_{13}H_{27}$-$(OCH_2CH_2)_4$—OH) as $IsoC_{13}EO$-4. The zwitterionic surfactant, which was a sulfobetaine surfactant, was alkyl hydroxypropyl sulfobetaine composed of alkyl group with 16~18 carbon atoms ($C_{16~18}H_{33~37}$-N$(CH_3)_2$-$CH_2CH(OH\ CH_2SO_3Na)$) as HSB1618. This surfactant package was diluted with tap water to form a spacer fluid. The spacer fluid was composed of 5.0 wt % surfactant package and 95.0 wt. % tap water.

The spacer fluid was then evaluated using the sleeve cleaning test, as described above. The spacer fluid presented a mud removal efficiency of 85.40% at 5 mins and 88.03% at 10 mins for OBM 1.

Example 2

A surfactant package composed of 25 wt. % alkyl ether carboxylate, 25 wt. % alcohol ethoxylate, and 50 wt. % zwitterionic surfactant was prepared. The alky ether carboxylate was composed of nine moles ethylene oxide functional group and alkyl group with 12~14 carbon atoms (C12~14$H_{25~29}$-$(OCH_2CH_2)_9$-COONa). The alcohol ethoxylate was isotridecanol ethoxylate composed of 4 moles ethylene oxide condensate of synthetic branched iso-tridecyl alcohol ($IsoC_{13}H_{27}$-$(OCH_2CH_2)_4$-OH). The zwitterionic surfactant, which was a betaine surfactant, was erucylamido propyl betaine composed of alkyl group with 16~18 carbon atoms ($C_{21}H_{41}CONH(CH_2)_3$-N$(CH_3)_2$-$CH_2COONa$). This surfactant package was diluted with tap water to form a spacer fluid. The spacer fluid was composed of 5.0 wt % surfactant package and 95.0 wt. % tap water.

The spacer fluid was then evaluated using the sleeve cleaning test, as described above. The spacer fluid presented a mud removal efficiency of 56.90% at 5 mins and 72.26% at 10 mins for OBM 1.

Example 3

Four spacer fluids composed of 5.0 wt. % of the surfactant package of Example 1, 0.5 wt. %, 1.0 wt. %, 2.0 wt. %, or 3.0 wt. % of the organic solvent limonene, and tap water were prepared. The spacer fluids were evaluated using the sleeve cleaning test, as described above. The mud removal efficiency of the spacer fluids for OBM 1 at 5 mins and 10 mins were as shown in Table 1.

TABLE 1

Mud Removal for Spacer Fluids with Limonene

| Sample ID | Surfactant Package of Example 1 (wt. %) | Limonene (wt. %) | Tap Water (wt. %) | Mud Removal Efficiency After 5 mins | Mud Removal Efficiency After 10 mins |
|---|---|---|---|---|---|
| E1 | 5.0 | 0.5 | 94.5 | 94.00 | 96.04 |
| E2 | 5.0 | 1.0 | 94.0 | 95.78 | 96.36 |
| E3 | 5.0 | 2.0 | 93.0 | 97.97 | 98.64 |
| E4 | 5.0 | 3.0 | 92.0 | 94.93 | 94.44 |

The optimal mud removal efficiency was found to occur using the spacer fluid with 2.0wt. % limonene, which had a mud removal efficiency of 97.97% at 5 mins and 98.64% at 10 mins, respectively. This mud removal efficiency was about 10% higher than the mud removal efficiency of the spacer fluid of Example 1, which did not contain limonene.

Example 4

Three spacer fluids composed of 5.0 wt. % of the surfactant package of Example 2, 1.0 wt. %, 2.0 wt. %, or 3.0 wt. % of the organic solvent 1-butanol, and tap water were prepared. The spacer fluids were evaluated using the sleeve cleaning test for OBM 1, as described above. The mud removal efficiency of the spacer fluids at 5 mins and 10 mins were as shown in Table 2.

TABLE 2

Mud Removal for Spacer Fluids with 1-Butanol

| Sample ID | Surfactant Package of Example 2 (wt. %) | 1-Butanol (wt. %) | Tap Water (wt. %) | Mud Removal Efficiency After 5 mins | Mud Removal Efficiency After 10 mins |
|---|---|---|---|---|---|
| E5 | 5.0 | 1.0 | 94.0 | — | 82.50 |
| E6 | 5.0 | 2.0 | 93.0 | 94.16 | 95.96 |
| E7 | 5.0 | 3.0 | 92.0 | 81.23 | 87.01 |

The optimal mud removal efficiency was found to occur using the spacer fluid with 2.0 wt. % 1-butanol, which had a mud removal efficiency of 97.97% at 5 mins and 98.64% at 10 mins, respectively. This mud removal efficiency was about 23-37% higher than the mud removal efficiency of the spacer fluid of Example 2, which did not contain 1-butanol.

Example 5

Five spacer fluids composed of 5.0 wt. % of the surfactant package of Example 1, 1 wt. % limonene, 0.0 wt. %, 0.5 wt. %, 1.0 wt. %, 2.0 wt. %, or 3.0 wt. % diethylene glycol monobutyl ether (DGMBE), and tap water were prepared. The spacer fluids were evaluated using the sleeve cleaning test, as described above. The mud removal efficiency of the spacer fluids for OBM 1 at 5 mins and 10 mins were as shown in Table 3.

TABLE 3

Mud Removal for Spacer Fluids with Limonene and DGMBE

| Sample ID | Surfactant Package of Example 1 (wt. %) | Limonene (wt. %) | DGMBE (wt. %) | Tap Water (wt. %) | Mud Removal Efficiency After 5 mins | Mud Removal Efficiency After 10 mins |
|---|---|---|---|---|---|---|
| E8 | 5.0 | 1.0 | 0.0 | 94.0 | 92.16 | 93.62 |
| E9 | 5.0 | 1.0 | 0.5 | 93.5 | 92.13 | 93.96 |
| E10 | 5.0 | 1.0 | 1.0 | 93.0 | 90.65 | 92.27 |
| E11 | 5.0 | 1.0 | 2.0 | 92.0 | 88.02 | 88.33 |
| E12 | 5.0 | 1.0 | 3.0 | 91.0 | 69.90 | 70.03 |

The optimal mud removal efficiency was found to occur using the spacer fluid with 0.5 wt. % DGMBE in addition to 1.0 wt. % limonene, which had a mud removal efficiency of 92.13% at 5 mins and 93.96% at 10 mins, respectively.

Example 6

A surfactant package composed of alkyl ether carboxylate, alcohol ethoxylate, zwitterionic surfactant, and/or limonene was prepared, as shown in Table 4. The alky ether carboxylate was composed of nine ethylene oxide functional group and alkyl group with 12~14 carbon atoms ($C_{12-14}H_{25}$-29-$(OCH_2CH_2)_9$-COONa). The alcohol ethoxylate was isotridecanol ethoxylate composed of 4 moles ethylene oxide condensate of synthetic branched iso-tridecyl alcohol ($IsoC_{13}H_{27}$-$(OCH_2CH_2)_4$-OH). The zwitterionic surfactant, which was a sulfobetaine surfactant, was alkyl hydroxypropyl sulfobetaine composed of alkyl group with 16~18 carbon atoms ($C_{16-18}H_{33-37}$-N $(CH_3)_2$-$CH_2CH(OH)$ $CH_2SO_3Na$). This surfactant package was diluted with tap water to form a spacer fluid. The spacer fluid was composed of 5.0 wt % surfactant package and 95.0 wt. % tap water.

The spacer fluid was then evaluated using the sleeve cleaning test for OBM 1, as described above.

TABLE 4

Mud Removal for Spacer Fluids with Limonene

| Sample ID | Alkyl Ether Carboxylate in Surfactant Package (wt. %) | Alcohol Ethoxylate in Surfactant Package (wt. %) | Zwitterionic Surfactant in Surfactant Package (wt. %) | Limonene (wt. %) | Tap Water (wt. %) | Mud Removal Efficiency After 5 mins | Mud Removal Efficiency After 10 mins |
|---|---|---|---|---|---|---|---|
| CE1 | 0 | 25 | 50 | 0.8 | 94.2 | 70.40 | 74.26 |
| CE2 | 25 | 0 | 50 | 0.8 | 94.2 | 70.21 | 71.28 |
| CE3 | 25 | 25 | 0 | 0.8 | 94.2 | 60.19 | 63.90 |
| E13 | 25 | 25 | 50 | 0.8 | 94.2 | 92.16 | 93.62 |
| E14 | 25 | 25 | 50 | 0 | 95.0 | 85.40 | 88.03 |

The presence of all three of the alkyl ether carboxylate, the alcohol ethoxylate, and the zwitterionic surfactant improved the mud removal compared to surfactant packages that only included two of the alkyl ether carboxylate, the alcohol ethoxylate, and the zwitterionic surfactant.

Example 8

Figure 2:
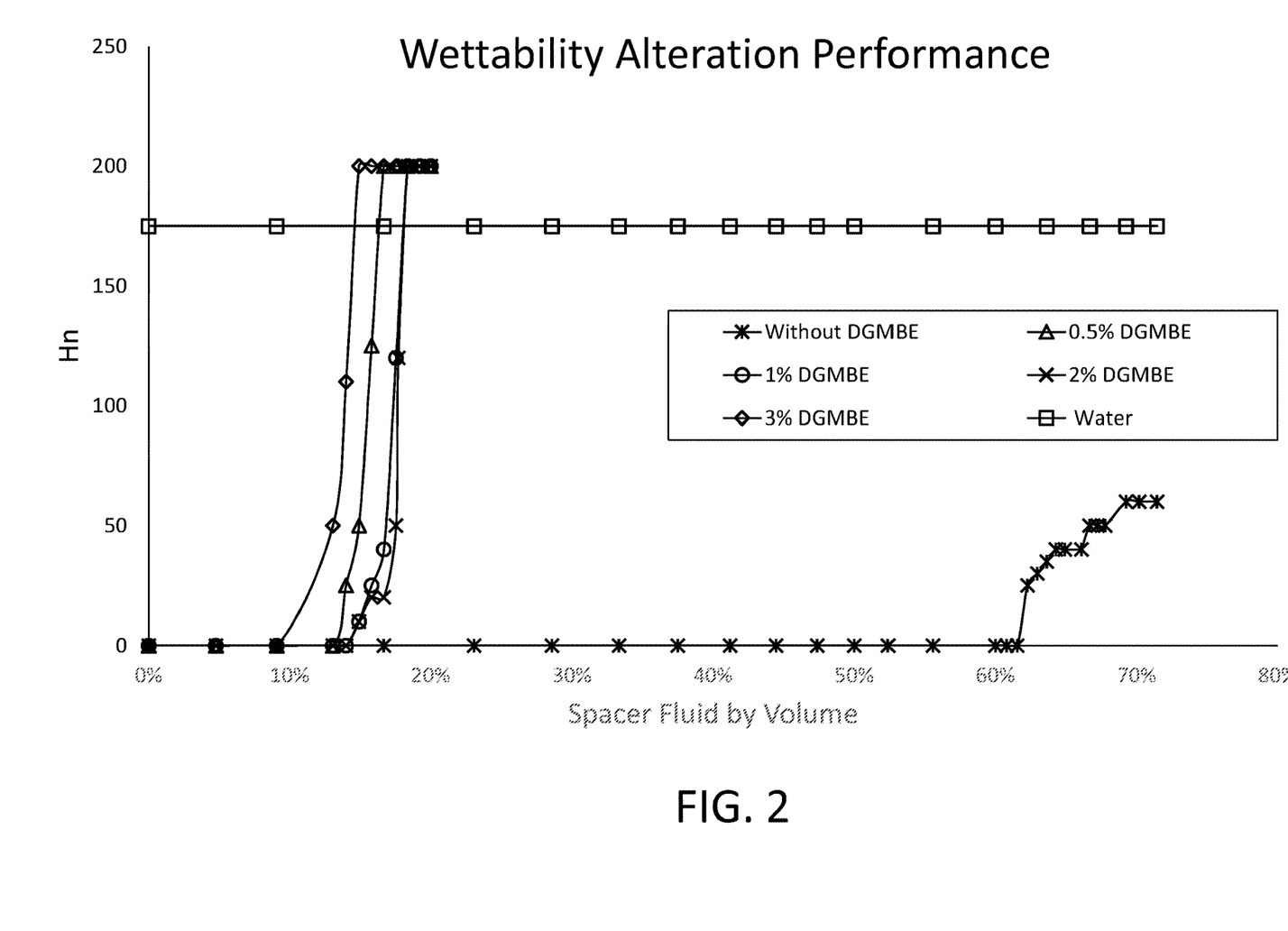
FIG. 2 graphically depicts wettability alteration performance for spacer fluid samples having varying DGMBE concentration, according to one or more embodiments described herein.

A wettability alteration test was performed, as described above, on tap water alone, and on five spacer fluids composed of 5.0 wt. % of the surfactant package of Example 1, 1.0 wt. % limonene, 0.0 wt. %, 0.5 wt. %, 1.0 wt. %, 2.0 wt. %, or 3.0 wt. % DGMBE, and tap water. The oil-based drilling mud used was OBM 2. The results are presented in FIG. 2. As illustrated by FIG. 2 the addition of DGMBE can dramatically enhance the wettability alteration performance of a spacer fluid with a surfactant package composed of alkyl ether carboxylate, alcohol ethoxylate, and zwitterionic surfactant. The optimal addition of DGMBE was found to be around 0.5% with consideration of mud removal efficiency, as the spacer fluid with 1 wt. % limonene and 0.5 wt. % DGMBE was found to completely invert the wettability from oil to water with 16.67% spacer fluid.

The present disclosure includes numerous aspects, referred to as Aspects 1-20, as described hereinbelow.

Aspect 1. A method for cementing a wellbore, the method comprising introducing a spacer fluid into the wellbore such that at least a portion of a drilling fluid positioned in the wellbore is displaced by the spacer fluid, the spacer fluid comprising from 80 wt. % to 99 wt. % of an aqueous based fluid, based on the total weight of the spacer fluid from 1 wt. % to 20 wt. % of a surfactant package, based on the total weight of the spacer fluid, wherein the surfactant package comprises all surfactants in the spacer fluid, and wherein the surfactant package comprises at least 99 wt. %, based on the total weight of the surfactant package, of the combination of one or more alkyl ether carboxylates, one or more alcohol ethoxylates, and one or more zwitterionic surfactants, and introducing a cement slurry into the wellbore such that at least a portion of the spacer fluid is displaced by the cement slurry.

Aspect 2. The method of aspect 1, wherein the surfactant package comprises from 10 wt. % to 40 wt. % of the one or more alkyl ether carboxylates, based on the total weight of the surfactant package, from 10 wt. % to 40 wt. % of the one or more alcohol ethoxylates, based on the total weight of the surfactant package, and from 20 wt. % to 80 wt. % of the one or more zwitterionic surfactants, based on the total weight of the surfactant package.

Aspect 3. The method of aspect 1 or aspect 2, wherein the spacer fluid comprises from 0.5 wt. % to 2 wt. % of the one or more alkyl ether carboxylates, based on the total weight of the spacer fluid, from 0.5 wt. % to 2 wt. % of the one or more alcohol ethoxylates, based on the total weight of the spacer fluid, and from 1 wt. % to 4 wt. % of the one or more zwitterionic surfactants, based on the total weight of the spacer fluid.

Aspect 4. The method of any one of aspects 1-3, wherein one or more of the zwitterionic surfactants are betaine surfactants.

Aspect 5. The method of aspect 4, wherein the betaine surfactants have the formula $R_3-N^+(R_4)_2-(R_5)_n-COO^-$, wherein $R_3$ is an alkyl group, an alkyl amide group or an alkyl ester group with 4 to 28 carbons, $R_4$ is an alkyl group with 1 to 5 carbons, $R_5$ is alkyl group with 1 to 5 carbons, and n is an integer greater than or equal to 0.

Aspect 6. The method of any one of aspects 1-5, wherein one or more of the zwitterionic surfactants are sulfobetaine surfactants.

Aspect 7. The method of aspect 6, wherein the sulfobetaine surfactants have the formula $R_6-N-R_7-Z$, wherein $R_6$ is an alkyl group, alkyl amide group or alkyl ester group with 4 to 28 carbons, $R_7$ is an alkyl group with 1 to 5 carbons, and Z is a propyl sulfonate functional group or a hydroxypropyl sulfonate functional group.

Aspect 8. The method of aspect 7, wherein $R_6$ is an alkyl group with 16 to 18 carbons, $R_7$ is an alkyl group with 2 carbons, and Z is a hydroxypropyl sulfonate functional group.

Aspect 9. The method of any one of aspects 1-8, wherein one or more of the alkyl ether carboxylates have the formula $R_1-(OCH_2CH_2)_nCOO^-$, wherein $R_1$ is an alkyl group with 7 to 28 carbons, and wherein n is from 2 to 25.

Aspect 10. The method of aspect 9, wherein $R_1$ is an alkyl group with 12 to 14 carbons and n is 9.

Aspect 11. The method of claim 1, wherein one or more of the alcohol ethoxylates have the formula $R_2-(OCH_2CH_2)_n-OH$, wherein $R_2$ an alkyl group with 7 to 28 carbons, and n is from 2 to 25.

Aspect 12. The method of aspect 11, wherein $R_2$ an iso-tridecyl group and n is 4.

Aspect 13. The method of any one of aspects 1-12, wherein the spacer fluid further comprises, based on the total weight of the spacer fluid, from 0.1 wt. % to 10 wt. % of an organic solvent.

Aspect 14. The method of aspect 13, wherein the organic solvent comprises limonene, 1-butanol, DGMBE, or combinations thereof.

Aspect 15. The method of aspect 13, wherein the organic solvent comprises limonene and DGMBE.

Aspect 16. The method of aspect 13, wherein the organic solvent comprises limonene in an amount of from 0.5 wt. % to 3 wt. %, based on the total weight of the spacer fluid, and DGMBE in an amount of from 0.1 wt. % to 3 wt. %, based on the total weight of the spacer fluid.

Aspect 17. The method of aspect 13, wherein the spacer fluid comprises 1.5 wt. % to 2.5 wt. % limonene, and 0.1 wt. % to 1 wt. % DGMBE, based on the total weight of the spacer fluid.

Aspect 18. The method of any one of aspects 1-17, wherein the spacer fluid is pumped into a first conduit defined by a wall of a tubular in the wellbore, the cement slurry is pumped into the first conduit, at least a portion of the drilling fluid exits the wellbore through a second conduit defined by a wall of the tubular and a wall of the wellbore.

Aspect 19. The method of any one of aspects 1-18, wherein the cement slurry is in contact with the spacer fluid.

Aspect 20. The method of any one of aspects 1-19, the spacer fluid is in contact with a drilling fluid and the cement slurry.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims infra should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the claims recited infra and their equivalents.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Where a range of values is provided in the Specification or in the appended Claims, it is understood that the interval encompasses each intervening value between the upper limit and the lower limit as well as the upper limit and the lower limit. The present disclosure encompasses and bounds smaller ranges of the interval subject to any specific exclusion provided.

What is claimed is:

1. A method for cementing a wellbore, the method comprising:
introducing a spacer fluid into the wellbore such that at least a portion of a drilling fluid positioned in the wellbore is displaced by the spacer fluid, the spacer fluid comprising:
from 80 wt. % to 99 wt. % of an aqueous based fluid, based on the total weight of the spacer fluid; and
from 1 wt. % to 20 wt. % of a surfactant package, based on the total weight of the spacer fluid, wherein the surfactant package comprises all surfactants in the spacer fluid, and wherein the surfactant package comprises at least 99 wt. %, based on the total weight of the surfactant package, of the combination of:
from 10 wt. % to 40 wt. % of one or more alkyl ether carboxylates, based on the total weight of the surfactant package, wherein the one or more alkyl ether carboxylates consist of the formula $R_1$-$(OCH_2CH_2)_n$COO$^-$, wherein $R_1$ is an alkyl group with 7 to 28 carbons, and wherein n is from 2 to 25;
from 10 wt. % to 40 wt. % of one or more alcohol ethoxylates, based on the total weight of the surfactant package; and
from 20 wt. % to 80 wt. % of one or more zwitterionic surfactants, based on the total weight of the surfactant package; and
introducing a cement slurry into the wellbore such that at least a portion of the spacer fluid is displaced by the cement slurry.

2. The method of claim 1, wherein the spacer fluid comprises:
from 0.5 wt. % to 2 wt. % of the one or more alkyl ether carboxylates, based on the total weight of the spacer fluid;
from 0.5 wt. % to 2 wt. % of the one or more alcohol ethoxylates, based on the total weight of the spacer fluid; and
from 1 wt. % to 4 wt. % of the one or more zwitterionic surfactants, based on the total weight of the spacer fluid.

3. The method of claim 1, wherein one or more of the zwitterionic surfactants are betaine surfactants.

4. The method of claim 3, wherein the betaine surfactants have the formula $R_3$-$N^+(R_4)_2$-$(R_5)_n$-COO$^-$, wherein:
$R_3$ is an alkyl group, an alkyl amide group or an alkyl ester group with 4 to 28 carbons; $R_4$ is an alkyl group with 1 to 5 carbons;
$R_5$ is alkyl group with 1 to 5 carbons, and n is an integer greater than or equal to 0.

5. The method of claim 1, wherein one or more of the zwitterionic surfactants are sulfobetaine surfactants.

6. The method of claim 5, wherein the sulfobetaine surfactants have the formula $R_6$-N-$R_7$-Z, wherein:
$R_6$ is an alkyl group, alkyl amide group or alkyl ester group with 4 to 28 carbons;
$R_7$ is an alkyl group with 1 to 5 carbons; and
Z is a propyl sulfonate functional group or a hydroxypropyl sulfonate functional group.

7. The method of claim 6, wherein $R_6$ is an alkyl group with 16 to 18 carbons, $R_7$ is an alkyl group with 2 carbons, and Z is a hydroxypropyl sulfonate functional group.

8. The method of claim 1, wherein $R_1$ is an alkyl group with 12 to 14 carbons and n is 9.

9. The method of claim 1, wherein one or more of the alcohol ethoxylates have the formula $R_2$-$(OCH_2CH_2)_n$-OH, wherein $R_2$ an alkyl group with 7 to 28 carbons, and n is from 2 to 25.

10. The method of claim 9, wherein $R_2$ an iso-tridecyl group and n is 4.

11. The method of claim 1, wherein the spacer fluid further comprises, based on the total weight of the spacer fluid, from 0.1 wt. % to 10 wt. % of an organic solvent.

12. The method of claim 11, wherein the organic solvent comprises limonene, 1-butanol, diethylene glycol monobutyl ether (DGMBE), or combinations thereof.

13. The method of claim 11, wherein the organic solvent comprises limonene and DGMBE.

14. The method of claim 1, wherein:
the spacer fluid is pumped into a first conduit defined by a wall of a tubular in the wellbore;
the cement slurry is pumped into the first conduit; and
at least a portion of the drilling fluid exits the wellbore through a second conduit defined by a wall of the tubular and a wall of the wellbore.

15. The method of claim 1, wherein the cement slurry is in contact with the spacer fluid.

16. The method of claim 1, wherein the spacer fluid is in contact with the drilling fluid and the cement slurry.

17. A method for cementing a wellbore, the method comprising:
introducing a spacer fluid into the wellbore such that at least a portion of a drilling fluid positioned in the wellbore is displaced by the spacer fluid, the spacer fluid comprising:
from 80 wt. % to 99 wt. % of an aqueous based fluid, based on the total weight of the spacer fluid;
from 1 wt. % to 20 wt. % of a surfactant package, based on the total weight of the spacer fluid, wherein the surfactant package comprises all surfactants in the spacer fluid, and wherein the surfactant package comprises at least 99 wt. %, based on the total weight of the surfactant package, of the combination of:
one or more alkyl ether carboxylates, wherein the one or more alkyl ether carboxylates consist of the formula $R_1$-$(OCH_2CH_2)_n$COO$^-$, wherein $R_1$ is an alkyl group with 7 to 28 carbons, and wherein n is from 2 to 25;
one or more alcohol ethoxylates; and
one or more zwitterionic surfactants; and
introducing a cement slurry into the wellbore such that at least a portion of the spacer fluid is displaced by the cement slurry;
wherein the organic solvent comprises limonene and DGMBE.

18. The method of claim 17, wherein the organic solvent comprises:
limonene in an amount of from 0.5 wt. % to 3 wt. %, based on the total weight of the spacer fluid; and
DGMBE in an amount of from 0.1 wt. % to 3 wt. %, based on the total weight of the spacer fluid.

19. The method of claim 17, wherein the spacer fluid comprises 1.5 wt. % to 2.5 wt. % limonene, and 0.1 wt. % to 1 wt. % DGMBE, based on the total weight of the spacer fluid.

* * * * *